United States Patent
Fogard

(12)
(10) Patent No.: US 6,186,718 B1
(45) Date of Patent: *Feb. 13, 2001

(54) THREADED FASTENER HAVING A HEAD WITH A TRIANGLE CENTERPOST WITHIN A TRIANGLE RECESS

(75) Inventor: Matthew Charles Fogard, Lancaster, CA (US)

(73) Assignee: Northrop Grumman Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/099,582

(22) Filed: Jun. 18, 1998

(51) Int. Cl.⁷ ..................................... F16B 23/00
(52) U.S. Cl. .............................. 411/403; 411/919; 81/436
(58) Field of Search ..................... 411/402, 403, 411/407, 910, 513, 919; 70/404; 81/436, 460, 121.1

(56) References Cited

U.S. PATENT DOCUMENTS

| | | |
|---|---|---|
| 161,390 | 3/1875 | Cummings . |
| 755,804 | 3/1904 | Smith . |
| 2,169,460 * | 8/1939 | Broughton ........................ 411/403 |
| 3,213,719 * | 10/1965 | Kloack ............................ 411/413 |
| 3,330,177 | 7/1967 | Oliver . |
| 3,363,500 * | 1/1968 | Simko ............................. 411/413 |
| 3,854,372 | 12/1974 | Gutshall . |
| 3,872,904 | 3/1975 | Barlow . |
| 3,874,258 | 4/1975 | Semola et al. . |
| 4,149,434 | 4/1979 | Wilson . |
| 4,211,128 | 7/1980 | Plumer . |
| 4,242,932 | 1/1981 | Barmore . |
| 5,366,330 | 11/1994 | Cosenza . |
| 5,449,260 | 9/1995 | Whittle . |
| 5,641,258 | 6/1997 | Sala . |

FOREIGN PATENT DOCUMENTS

| | | | |
|---|---|---|---|
| 182174 * | 3/1907 | (DE) ................................. 411/402 |
| 1119435 * | 6/1956 | (FR) ................................. 411/412 |
| 1326 * | 4/1875 | (GB) ................................. 81/436 |

* cited by examiner

Primary Examiner—Flemming Saether
(74) Attorney, Agent, or Firm—Terry J. Anderson; Karl J. Hoch, Jr.

(57) ABSTRACT

The fastener of the present invention has a head integrally formed with a threaded shank. The face of the head has a triangular recess with a triangular centerpost extending upward from the recess. The recess has three sides forming corners, and the centerpost has three sides forming apices. The walls of the recess and the walls of the centerpost may form a channel therebetween and the top of the centerpost may be flush with the face of the head. The corners and the apices may be rounded to provide stress relief and to facilitate tool insertion and removal. The periphery of the head may be provided with a conical side wall narrowing toward the shank so that the fastener may be countersunk. The shank may be completely threaded or only partially threaded, and may have a pointed or chamfered end. It also may be provided with a hole so that a retaining device may be inserted therethrough.

8 Claims, 1 Drawing Sheet

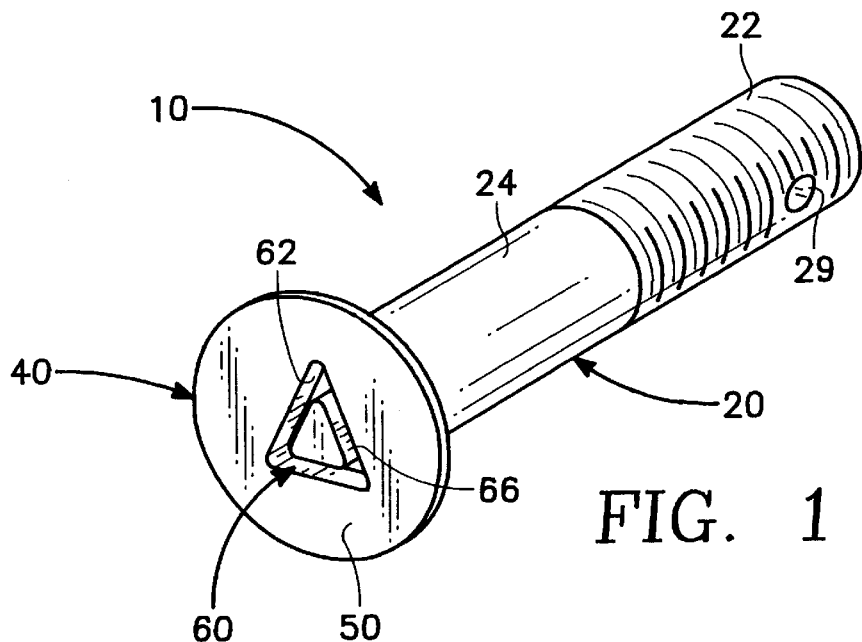
FIG. 1
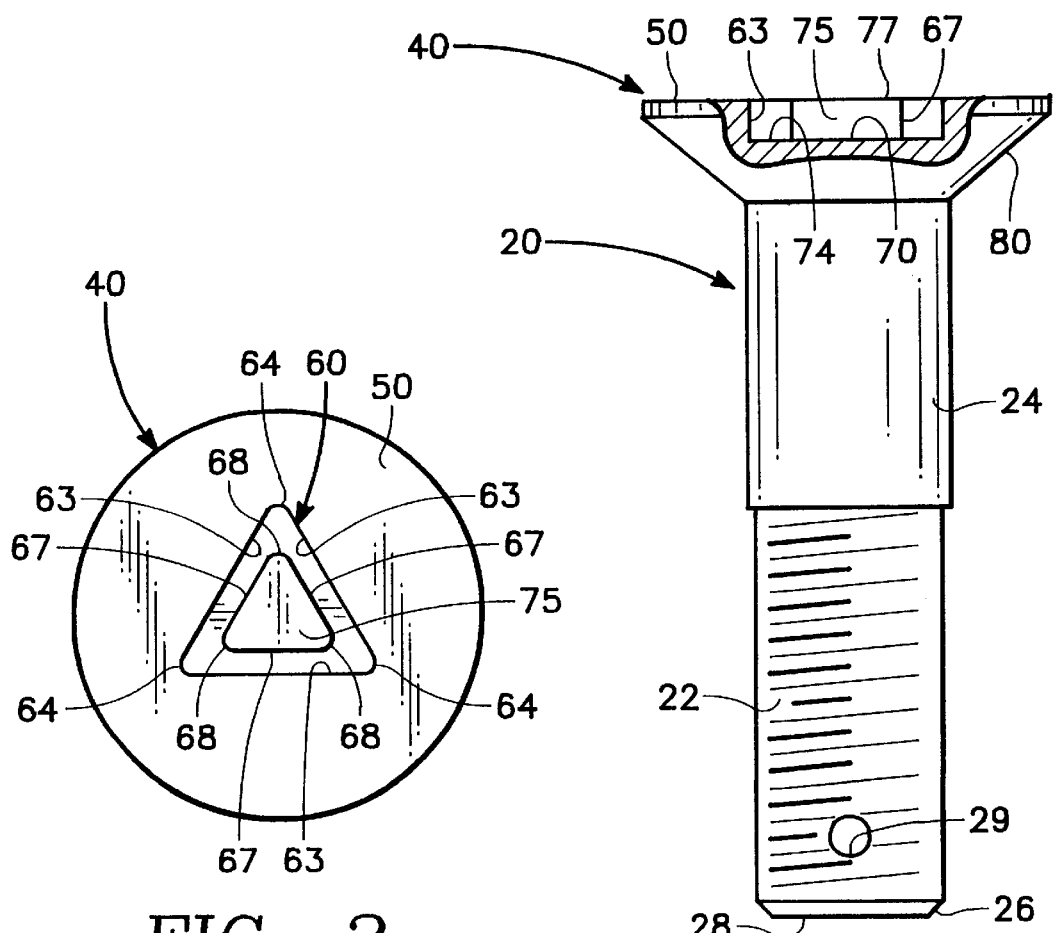
FIG. 2
FIG. 3

THREADED FASTENER HAVING A HEAD WITH A TRIANGLE CENTERPOST WITHIN A TRIANGLE RECESS

BACKGROUND OF THE INVENTION

1. Field of the Invention

The present invention relates to the field of threaded fasteners.

2. Description of the Related Art

Threaded fasteners, such as bolts or screws, have a variety of uses. Typically, a threaded fastener will have a threaded shank portion and an head. Torque is applied to the head to drive the threaded shank into threaded engagement with a nut or an other threaded surface.

To drive the fastener, the head may have recessed slots or grooves, such as a Phillips type, so that a tool may be inserted into the recess to apply torque to the fastener. Or, the head may have a polygonal periphery, so that a tool, such as a wrench or a socket, may engage the periphery of the head to apply torque to the fastener.

Often, the application of torque to the head can cause damage to head so that it becomes unusable. The slots, grooves, or periphery may "cam out" so that torque may no longer be applied to the head. This can occur if the tool is not properly seated when torque is applied. Or, it can occur if the fastener is over-tightened or if the threads become damaged, such as by galling, fusing, or corroding. Typically, the fastener is in threaded engagement when the head becomes unusable, so much time is lost removing the fastener. Yet another problem caused by improper seating, damaged threads, or over-tightening is that they can cause the tool to break rather than camming out the head.

Some head designs are better at preventing camming while others at protecting the tool. For example, the Phillips head or the head employing a polygonal periphery may cam out, while those with arcuate slots can cause the blades of the tool to break.

Moreover, it is often desirable to countersink a fastener flush with adjacent material to improve appearance or functionality. It is often desirable, therefore, to have the periphery of the head meet closely with the adjacent material. This is all but impossible when a periphery engaging tool is used because a large space must be left so that the tool may engage the periphery of the head while a portion of the head is screwed below the surface of the adjacent material. These type heads, therefore, are not desirable in countersink applications.

Providing the head of the fastener with a countersink also limits the depth of the recess near the periphery of the head. If the recessed area is too deep, it may extend through the countersink portion and allow the tool to contact the interior side of the adjacent material thereby interfering with operation of the tool. Or, if the recess is large and deep so that it approaches the countersink wall of the head, it may weaken the integrity of the head and allow the top portion of the head to separate from the rest of the head when torque is applied.

BRIEF SUMMARY OF THE INVENTION

The fastener of the present invention has a head integrally formed with a threaded shank. The face of the head has a triangular recess with a triangular centerpost extending upward from the recess. The recess has three sides forming corners, and the centerpost has three sides forming apices. The walls of the recess and the walls of the centerpost may form a channel therebetween.

With the present invention, the top of the centerpost may be flush with the face of the head. Additionally, the corners and the apices may be rounded to provide stress relief and to facilitate tool insertion and removal. Also, the head may be provided with a conical side wall narrowing toward the shank so that the fastener may be countersunk.

Furthermore, the present invention may be provided with a hole through the shank so a retention device, such as a cotter pin, may be inserted through the hole. The shank may be completely threaded or only partially threaded and may have a pointed or chamfered end.

The present invention allows better distribution of torquing loads and better facilitates tool alignment and insertion, among other benefits. The design of the present invention provides an improved fastener that reduces the likelihood of camming and of tool damage. Additionally, features of embodiments of the present invention allow it to be countersunk flush with the surrounding material and to be retained in case of inadvertent loosening.

BRIEF DESCRIPTION OF THE DRAWINGS

FIG. 1 shows an orthographic projection an embodiment of the fastener of the present invention.

FIG. 2 shows a top view of the face of the head of the fastener of FIG. 1.

FIG. 3 shows a side view of the fastener of FIG. 1 with partial cut away section of the head.

DETAILED DESCRIPTION OF THE PRESENT INVENTION

FIGS. 1–3 illustrate the preferred embodiment of a fastener 10 of the present invention. The fastener 10 may take the form of a screw or a bolt. For illustration purposes, the fastener 10 is depicted as a bolt adapted to receive a nut or an other surface capable of threadingly engaging the bolt, such as for example, a plate, a bore, or the like.

Turning to FIGS. 1 & 2, the fastener 10 has a shank portion 20 and a head portion 40. The head portion 40 has a face 50 with a recessed channel 60. The recessed channel 60 forms a triangular shape in the face 50 of the head portion 40. The recessed channel 60 has an outer wall 62 having three sides 63 forming corners 64. The recessed channel 60 also has an inner wall 66 having three sides 67 forming apices 68. In the preferred embodiment, the corners 64 and the apices 68 are rounded to provide improved stress relief and to facilitate insertion of a torque providing tool (not shown). Typically, the rounded corners 64 and rounded apices 68 have the same radius to facilitate manufacturing. With the present invention, however, it is not necessary that the radii of the rounded corners 64 and the radii of the rounded apices 68 have the same radius to provide stress relief and to facilitate tool insertion.

It is also presently preferred that the three sides 68 of the inner wall 66 be of equal length. Likewise, it is presently preferred that the three sides 63 of outer wall 62 be of equal length and parallel to the respective inner wall side 68.

An advantage of the present invention is that the inner wall 67, in addition to the outer wall 63 may engage the torquing tool. In such a case, the inner wall 67 and the outer wall 63 together provide six surfaces for the torquing tool to engage so as to distribute torque. Increasing the number of load bearing surfaces and distributing the loads between inner and outer walls helps preserve the integrity of the surfaces so as to make it more resistant to camming.

Another advantage of the present invention is that it allows a torquing tool to have an integrally formed triangular driver head that allows torquing loads to be distributed near the apices of the driver head thereby increasing the strength of the torquing tool and making it more resistant to breaking.

Turning to FIG. 3, the presently preferred embodiment of the present invention also may be described as having a face 50 with a triangular shaped recess 70 having a triangular post 75 extending from the triangular recessed portion 70 to form the channel 60. The triangular post 75 has a top 77 which is preferably, but not necessarily, flush with the face 50.

In addition to the above stated advantageous, the triangle post 75 serves to ensure the torquing tool is aligned and seated properly within the triangular recess 70. Proper alignment of the torquing tool helps ensure that the tool will not slip out when torque is applied. This feature helps retain the torquing tool when torque is applied. This allows the torquing tool to remain better seated when a universal joint is being used between the driving head of the tool and torque application.

Another advantage with the present invention not realized with other prior art is that if the torquing tool slips out of the channel 60, only one side of the inner wall 67 and only one side of the outer wall 63 are damaged, leaving the remaining walls undamaged. This helps reduce the amount of camming of the head 40 and can also reduce tool damage.

Although the recess portion 70 and the post 75 are depicted with planar side walls 63 and 67 orthogonal to a base 74 of the recess portion, a portion of either side walls 63 and 67 may be angled or may be rounded. This feature can improve torquing tool insertion if for example, the side walls 63 and 67 are beveled, or rounded near, or at, the face 50 of the head 40.

The fastener of the present invention may be constructed so that it is capable of being countersunk. As such, the head may have a conical side wall 80 narrowing toward the shank 20. The conical side wall 80 allows the face 50 of the fastener to sink flush with the adjacent material. For example, the conical side wall 80 may be formed so that the tangent lines of the side wall 80 form a 100 degree angle. The countersink angle must allow the channel 60 to be formed having sufficient depth and width to prevent the head or the tool from breaking. For example, for a fastener having a head diameter of 0.5 inches, a 100 degree countersink angle, and a shank diameter of 0.25, the channel 60, may be formed having a depth of 0.05 inches and a width of 0.03 inches when the outer wall 63 forms an equilateral triangle within a radius of 0.15 inches. These angles and dimensions are provided as a non-exclusive example. As is obvious to one skilled in the art, many other angles and dimensions may be used while retaining the advantages of the present invention over the prior art.

The head portion 40, typically, is integrally formed with the shank 20 of the fastener 10. The shaft 20 may be completely threaded, or it may have a threaded portion 22 and a non-threaded portion 24. Furthermore, the shaft 20 may have a pointed end adapted for use as a wood, sheet metal, or similar type fastener. Or, the shaft may have a flat end 28 which may be chamfered 26 as shown in FIG. 3.

The present invention may be formed so that a retaining device may be installed on, or through the shaft 20. A retaining device, such as a "c" clip may be placed on the shaft to ensure retention of the fastener, or the nut, should loosening inadvertently occur. Should a retention device be desired, it is presently preferred to form the shaft 20 with a hole 29 so that a cotter pin may be inserted therethrough to ensure retention of the fastener, or the nut.

While the only the presently preferred embodiment of the invention is described above, alternate embodiments may be formed that fall within the scope of the present invention. The true scope and breadth of the invention, therefore, is limited only by what is claimed.

What I claim is:

1. A threaded fastener for use with a torquing tool having a generally triangularly shaped drive head and engagable to the fastener, the fastener comprising:

a shank portion;

a head portion integrally formed with the shank portion and defining an upper face, the head portion having:

an inner wall formed on the upper face adapted to engage to the driver head of the torquing tool; and an outer wall formed on the upper face adapted to engage to the driver head of the torquing tool when the torquing tool is engaged to the inner wall;

wherein the inner wall and the outer wall are in generally parallel spaced relation and define a slot having a generally triangular configuration on the upper face and a generally planer base surface, the slot defining a generally triangular centerpost to provide increased torquing wherein apices of the triangular centerpost are rounded and corners of the slot are rounded.

2. The threaded fastener of claim 1 wherein the triangular centerpost has three apices adapted to engage the driver head and the slot has three corners adapted to engage the driver head.

3. The threaded fastener of claim 1 wherein the slot is equilateral.

4. The threaded fastener of claim 1 wherein the centerpost is equilateral.

5. The threaded fastener of claim 1 wherein the head portion further comprises a conical side wall portion, the conical side wall portion narrowing toward the shank portion.

6. The threaded fastener of claim 5 wherein the shank portion further comprises a threaded portion and a non-threaded portion.

7. The threaded fastener of claim 6 wherein the shank portion further comprises a hole formed therethrough.

8. The threaded fastener of claim 7 wherein the shank portion has a chamfered end.

\* \* \* \* \*